G. OGG.
Harrow.
No. 62,875. Patented Mar. 12, 1867.
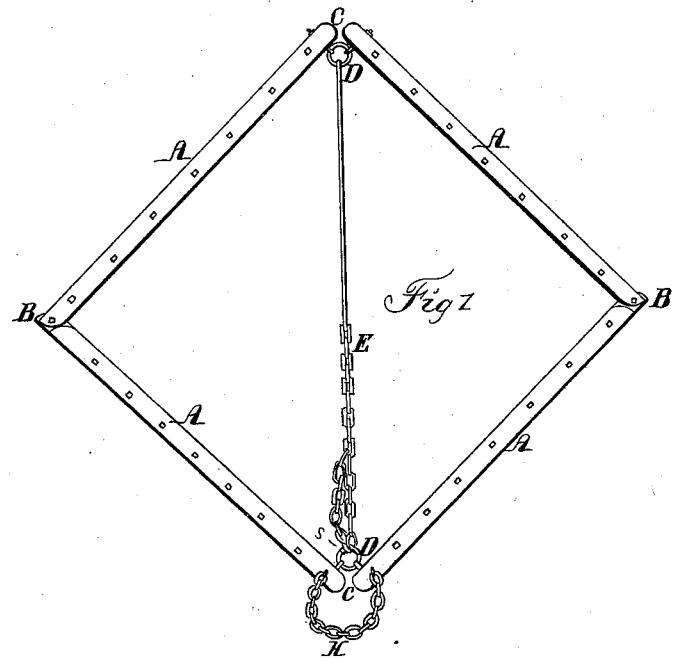
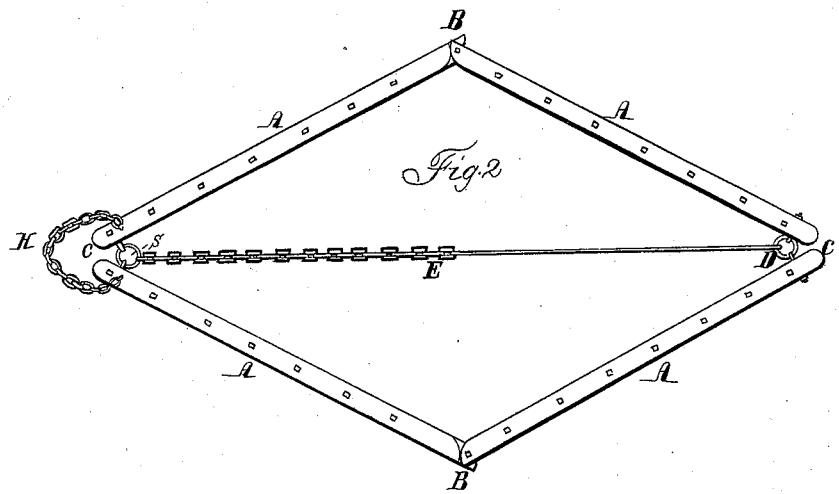
Witnesses
Theo Franks
M. B. Robinson
Inventor
George Ogg

United States Patent Office.

GEORGE OGG, OF LACON, ILLINOIS.

Letters Patent No. 62,875, dated March 12, 1867.

IMPROVEMENT IN HARROWS.

The Schedule referred to in these Letters Patent and making part of the same.

TO ALL WHOM IT MAY CONCERN:

Be it known that I, GEORGE OGG, of the town of Lacon, and county of Marshall, in the State of Illinois, have invented a new and useful Improvement in Harrows; and I do hereby declare that the following is a full and exact description of the construction and operation of the same, reference being had to the annexed drawings, making part of this specification, in which—

Figure 1 represents a ground plan of harrow when at its utmost extension in width.

Figure 2 represents same in a contracted width; and

Figure 3 represents an elevation of one side or arm of the harrow, showing the manner in which the arms are connected at the angles or ends.

The nature of my invention consists in so constructing a harrow that it may be made to operate at an extended width, as in fig. 1, or in any desirable width of less dimensions, as in fig. 2.

To effect this the arms A A A A are secured to each other at one end by a screw-bolt, as at B, which will enable these arms to form different angles with each other; the other ends of the arms C will be connected by rings and screw eye-bolts, as at C. A chain, E, is attached to the ring D, and being provided at extreme end with a hook; and by passing through opposite ring D by means of the attachment of the hook into the chain or link thereof, the width of the harrow desired is effected. H represents the place of attachment of the horses.

What I claim, and desire to secure by Letters Patent, is—

The manner of connecting the arms with each other by the bolts B and rings D, and the arrangement and combination of the chain E, passing through the ring D, by which any width of harrow desired may be readily effected.

GEORGE OGG.

Witnesses:
THEOE. FRANKS,
M. B. ROBINSON.